United States Patent
Ochiai

(10) Patent No.: US 10,787,183 B2
(45) Date of Patent: Sep. 29, 2020

(54) RAILWAY VEHICLE AIR CONDITIONING MANAGEMENT SYSTEM AND RAILWAY VEHICLE AIR-CONDITIONING DEVICE

(71) Applicant: MITSUBISHI ELECTRIC CORPORATION, Chiyoda-ku, Tokyo (JP)

(72) Inventor: Yasutaka Ochiai, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 29 days.

(21) Appl. No.: 16/091,163

(22) PCT Filed: Jun. 9, 2016

(86) PCT No.: PCT/JP2016/067232
§ 371 (c)(1),
(2) Date: Oct. 4, 2018

(87) PCT Pub. No.: WO2017/212607
PCT Pub. Date: Dec. 14, 2017

(65) Prior Publication Data
US 2019/0111949 A1    Apr. 18, 2019

(51) Int. Cl.
*B61D 27/00* (2006.01)
*F25B 49/02* (2006.01)
*B60H 1/00* (2006.01)

(52) U.S. Cl.
CPC .......... *B61D 27/0018* (2013.01); *B60H 1/00* (2013.01); *B60H 1/00978* (2013.01); *F25B 49/02* (2013.01)

(58) Field of Classification Search
CPC ...... B61D 27/00; B61D 27/0018; B60H 1/00; B60H 1/00978; F25B 49/02
See application file for complete search history.

(56) References Cited

U.S. PATENT DOCUMENTS

| | | | |
|---|---|---|---|
| 4,219,071 A * | 8/1980 | Careglio | B60H 1/00014 165/202 |
| 2011/0071722 A1 * | 3/2011 | Uto | B60H 1/00978 701/29.5 |

(Continued)

FOREIGN PATENT DOCUMENTS

| | | |
|---|---|---|
| JP | 2004-291899 A | 10/2004 |
| JP | 2005036989 A | 2/2005 |

(Continued)

OTHER PUBLICATIONS

International Search Report (PCT/ISA/210) dated Aug. 16, 2016, by the Japan Patent Office as the International Searching Authority for International Application No. PCT/JP2016/067232.

(Continued)

*Primary Examiner* — Marc E Norman
(74) *Attorney, Agent, or Firm* — Buchanan Ingersoll & Rooney PC

(57) ABSTRACT

A railway vehicle air conditioning management system according to the present invention includes a railway vehicle air-conditioning device installed in a railway vehicle, having a refrigerant circuit configured by including at least a compressor, a heat source side heat exchanger, a decompression device and a load side heat exchanger, and air-conditions an inside of the railway vehicle by circulating refrigerant in the refrigerant circuit, and a management device having a recording device in which vehicle air conditioning data including data showing operating states of the railway vehicle air-conditioning devices in a plurality of the railway vehicles are recorded, the railway vehicle air-conditioning device performs a special operation of operating in a pattern set in advance, in a state without humans in the railway vehicle, and the management device causes the recording device to record the vehicle air conditioning data (Continued)

including data showing the operating state in the special operation.

9 Claims, 9 Drawing Sheets

(56) References Cited

U.S. PATENT DOCUMENTS

2014/0028091 A1* 1/2014 Yoshimura ................ B60L 1/06
                                                    307/9.1
2017/0369084 A1* 12/2017 Goda ...................... B61C 17/00

FOREIGN PATENT DOCUMENTS

| JP | 2009018770 A | 1/2009 |
|----|--------------|--------|
| JP | 2009192096 A | 8/2009 |
| JP | 2015113058 A | 6/2015 |

OTHER PUBLICATIONS

Written Opinion (PCT/ISA/237) dated Aug. 16, 2016, by the Japan Patent Office as the International Searching Authority for International Application No. PCT/JP2016/067232.

Extended European Search Report dated May 29, 2019, issued by the European Patent Office in corresponding European Application No. 16904642.2. (11 pages).

Office Action dated Nov. 1, 2019, issued in corresponding Chinese Patent Application No. 201680086386.X, 13 pages including 6 pages of English translation.

* cited by examiner

RAILWAY VEHICLE AIR CONDITIONING MANAGEMENT SYSTEM AND RAILWAY VEHICLE AIR-CONDITIONING DEVICE

TECHNICAL FIELD

The present invention relates to a railway vehicle air-conditioning device that air-conditions a space in a railway vehicle of a train and a railway vehicle air conditioning management system. The present invention particularly relates to management of a state of a railway vehicle air-conditioning device.

BACKGROUND ART

For example, in each railway vehicle, a railway vehicle air-conditioning device that air-conditions a space in the railway vehicle is installed. In order to manage the state of the railway vehicle air-conditioning device, a reference temperature set value in an operation time, a temperature in the actual railway vehicle, and the like are stored as device monitoring data. There was proposed a device monitoring data analysis system that acquires device monitoring data when the train enters a vehicle plant or the like, analyzes data, outputs the frequency of threshold crossing that is the number of times a difference between a measured temperature and the reference temperature exceeds an allowable range, and supports judgment on failure or the like (refer to Patent Literature 1, for example).

CITATION LIST

Patent Literature

Patent Literature 1: Japanese Unexamined Patent Application Publication No. 2009-018770

SUMMARY OF INVENTION

Technical Problem

The system proposed in Patent Literature 1 performs analysis processing based on the device monitoring data in the railway vehicle air-conditioning device of the same railway vehicle. Therefore, the number of data that can be referenced is small, and enhancement of precision with which abnormality or the like is determined is limited.

The present invention has been made to solve the problem as described above, and an object of the present invention is to obtain a railway vehicle air conditioning management system that can manage a railway vehicle air-conditioning device based on further more data and a railway vehicle air-conditioning device.

Solution to Problem

A railway vehicle air conditioning management system according to one embodiment of the present invention includes a railway vehicle air-conditioning device installed in a railway vehicle, has a refrigerant circuit configured by including at least a compressor, a heat source side heat exchanger, a decompression device and a load side heat exchanger, and air-conditions an inside of the railway vehicle by circulating refrigerant in the refrigerant circuit, and a management device having a management storage device in which vehicle air conditioning data including data showing operating states of the railway vehicle air-conditioning devices in a plurality of the railway vehicles are recorded, the railway vehicle air-conditioning device performs a special operation of operating in a pattern set in advance in a state without humans in the railway vehicle, and the management device records the management storage device the vehicle air conditioning data including data showing the operating state in the special operation.

Advantageous Effects of Invention

According to one embodiment of the present invention, the vehicle air conditioning data collected from many railway vehicles are enabled to be recorded in the management storage device, so that many vehicle air conditioning data in which the environmental conditions, the operation conditions and other conditions are analogous to one another can be recorded. In particular, by recording the vehicle air conditioning data obtained by the special operation in the state without passengers, the number of data that can be referenced for determination of abnormal states and the like can be increased.

DESCRIPTION OF EMBODIMENTS

Hereinafter, embodiments of the present invention will be described with reference to the accompanying drawings. Here, in the following drawings, components assigned with the same reference signs are the same or corresponding components, and are common in the full text of the embodiments described as follows. The modes of the components shown in the full text of the specification are only illustration, and the components are not limited to these statements. In particular, combinations of the components are not limited to only the combinations in the respective embodiments, but the components described in one embodiment can be properly applied to other embodiments. As for high and low of pressure, high and low are not specially determined in a relationship with absolute values, but are relatively determined in states, operations and the like of a system, devices and the like. When a plurality of devices or the like of the same kinds that are distinguished by subscripts do not have to be specially distinguished or specified, the plurality of devices or the like of the same kinds may be described by omitting the subscripts.

Embodiment 1

Figure 1:
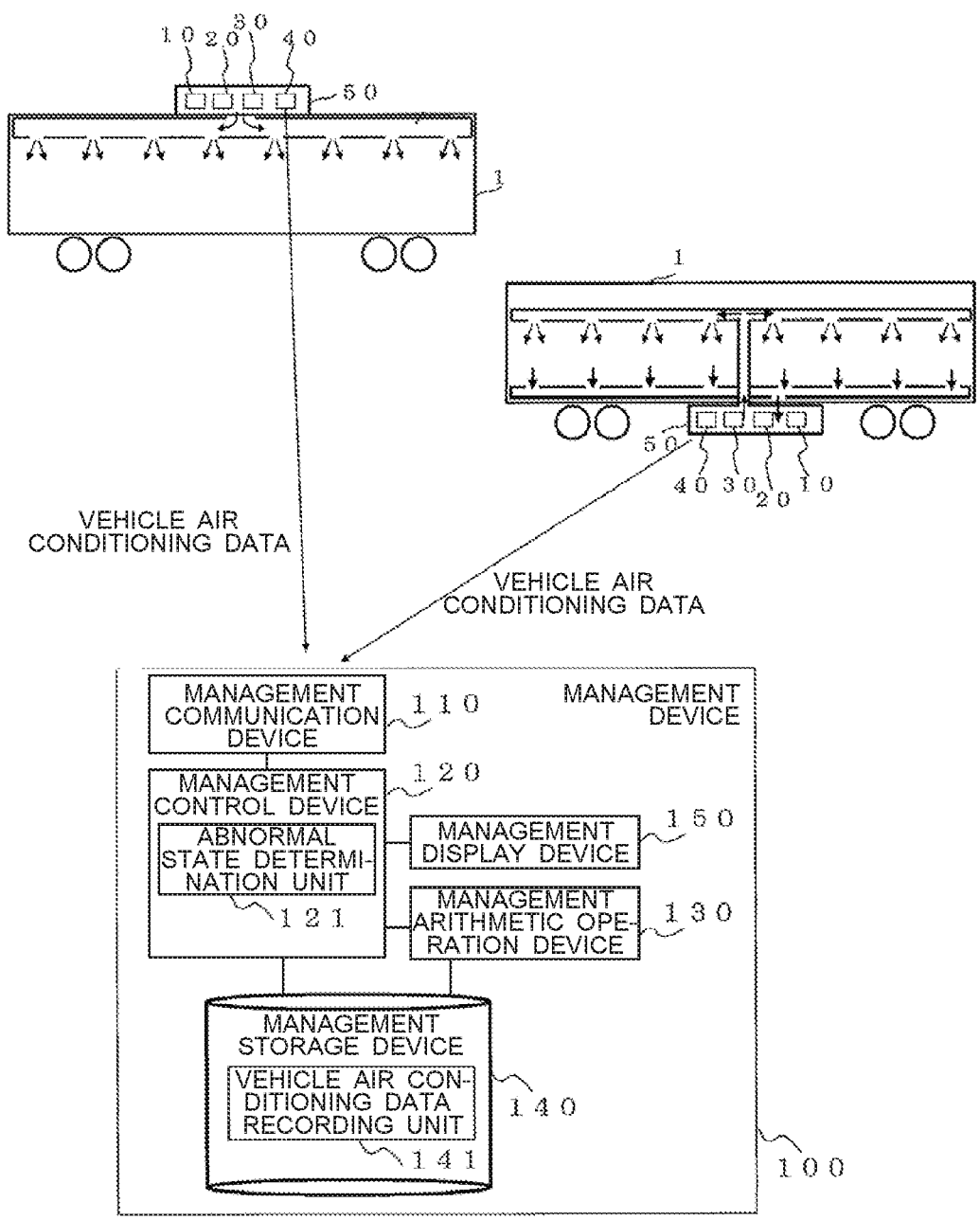
FIG. 1 is a diagram illustrating a configuration of a railway vehicle air conditioning management system according to Embodiment 1 of the present invention.

FIG. 1 is a diagram illustrating a configuration of a railway vehicle air conditioning management system according to Embodiment 1 of the present invention. In FIG. 1, a plurality of railway vehicles 1 each has a railway vehicle air-conditioning device 50. The railway vehicle air-conditioning device 50 is a device that performs cooling, heating and the like of an inside of the railway vehicle 1. The railway vehicle air-conditioning device 50 may be any type of a roof-placing type installed on a roof of the railway vehicle 1 and an underfloor type installed under a floor.

Each of the railway vehicle air-conditioning devices 50 in Embodiment 1 has a refrigerant circuit 10 and other devices as the devices for performing air conditioning. Further, each of the railway vehicle air-conditioning devices 50 has a vehicle air conditioning control device 20, a vehicle air conditioning storage device 30 and a vehicle air conditioning communication device 40 as the devices of a control system.

The vehicle air conditioning control device 20 controls operations of devices relating to air conditioning so that an inside of the railway vehicle reaches an in-vehicle set temperature. In Embodiment 1, the vehicle air conditioning control device 20 stores the vehicle air conditioning storage device 30 vehicle air conditioning data to be data for a management device 100 to manage the railway vehicle air-conditioning device 50. Here, the vehicle air conditioning data include, for example, data relating to the railway vehicle 1 such as a vehicle number, a train car composition and a year of manufacture. The vehicle air conditioning data also include, for example, instructions given to devices relating to air conditioning such as a driving frequency and a discharge temperature of a compressor 11 described later, values of physical quantities such as a temperature and a pressure detected by various sensors installed in the railway vehicle air-conditioning device 50, dates and times of detection, detection positions according to a commercially operating distance or other distances from a first departure, for example, and an operating state of the railway vehicle air-conditioning device 50 such as an integrated operating time period after repair (maintenance). However, all of these data are not included in the vehicle air conditioning data, but can be picked and chosen as required. Configurations of the devices relating to air conditioning will be described later.

The vehicle air conditioning storage device 30 stores data necessary for the vehicle air conditioning control device 20 to perform processing. In Embodiment 1, in particular, the air conditioning storage device 30 serves as a recording device that records vehicle air conditioning data that are sent to the management device 100 by the vehicle air conditioning communication device 40. The vehicle air conditioning communication device 40 is an interface of signal communication between the vehicle air conditioning control device 20 and the management device 100. For example, in Embodiment 1, the vehicle air conditioning communication device 40 sends the vehicle air conditioning data that are processed by the vehicle air conditioning control device 20 and recorded by the vehicle air conditioning storage device 30 to the management device 100 by including the vehicle air conditioning data in a signal. Further, the vehicle air conditioning communication device 40 sends data included in a signal that is sent from the management device 100, to the vehicle air conditioning control device 20.

The management device 100 manages a plurality of railway vehicles 1 based on the vehicle data in the plurality of railway vehicles 1. Although two of the railway vehicles 1 are illustrated in FIG. 1, the management device 100 can perform communication connection and management among the railway vehicle air-conditioning devices 50 of many railway vehicles 1 in reality. In Embodiment 1, in particular, the management device 100 performs data management relating to the railway vehicle air-conditioning devices 50 of the respective railway vehicles 1. The management device 100 is installed in a railway vehicle base or other places, for example. The management device 100 includes a management communication device 110, a management control device 120, a management arithmetic operation device 130, a management storage device 140 and a management display device 150.

The management communication device 110 is an interface of signal communication between the vehicle air conditioning control device 20 of the railway vehicle air-conditioning device 50 and the management control device 120. For example, in Embodiment 1, the management communication device 110 extracts the vehicle air conditioning data included in a signal sent from the railway vehicle air-conditioning device 50, and sends the vehicle air conditioning data to the management control device 120. Further, the management communication device 110 includes data from the management control device 120 in a signal to send the signal to the railway vehicle air-conditioning device 50.

The management control device 120 records the management storage device 140 the vehicle air conditioning data sent from the railway vehicle air-conditioning devices 50 of the plurality of railway vehicles 1. Further, the management control device 120 has an abnormal state determination unit 121, and performs processing of determining whether an abnormality is generated or a sign of an abnormality appears in the railway vehicle air-conditioning device 50 and the railway vehicle air-conditioning device 50 is in a state (hereinafter, referred to as an abnormal state) where occurrence of an abnormality is predicted. In Embodiment 1, the management control device 120 has the abnormal state determination unit 121, but the abnormal state determination unit 121 may be configured independently as an abnormal state determination device. The management arithmetic operation device 130 performs arithmetic operation processing of data necessary for the management control device 120 to perform processing, such as calculating a determination reference value based the vehicle air conditioning data, for example.

The management storage device 140 is a device that stores data relating to the processing of the management control device 120 and the management arithmetic operation device 130. In particular, the management storage device 140 of Embodiment 1 has a vehicle air conditioning data recording unit 141. The vehicle air conditioning data recording unit 141 is a database recording the vehicle air conditioning data. The management display device 150 performs, for example, display of a result of processing that is performed by the management control device 120.

Here, the management control device 120, the management arithmetic operation device 130 and the other devices of the management device 100 in the present embodiment can be configured by different kinds of hardware respectively, for example. Further, the device can be also configured in such a manner that an arithmetic operation control unit (computer) having a CPU (Central Processing Unit) is used as hardware, processing procedures such as control and arithmetic operation are programmed in advance, and is used as software, firmware or the like. The arithmetic operation control unit executes a program to perform processing, and realizes processing that is performed by the management control device 120, the management arithmetic operation device 130 and the like. Data on these programs may be stored in the management storage device 140, for example.

Figure 2:
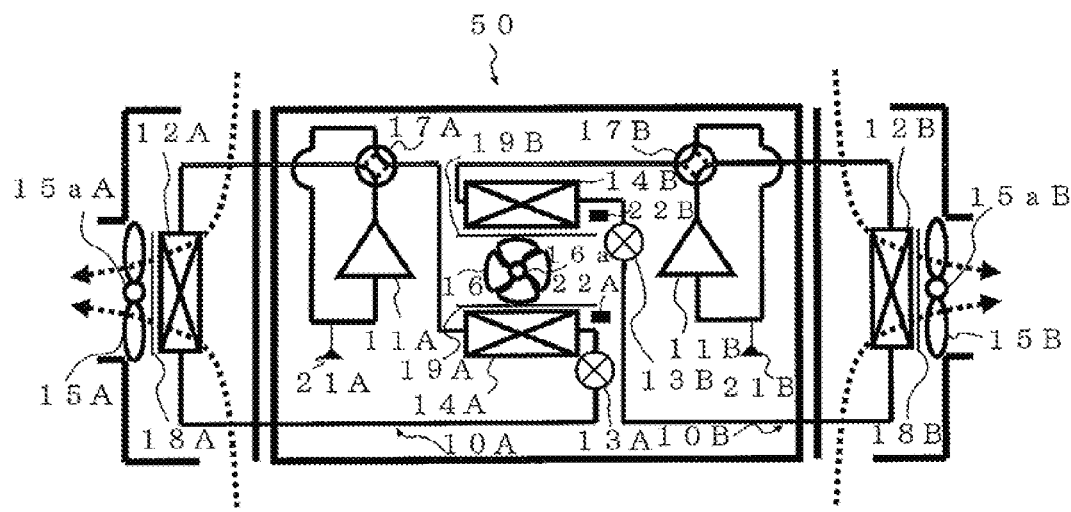
FIG. 2 is a diagram illustrating a configuration of devices relating to air conditioning of a railway vehicle air-conditioning device 50 according to Embodiment 1 of the present invention.

FIG. 2 is a diagram illustrating a configuration of devices relating to air conditioning of the railway vehicle air-conditioning device 50 according to Embodiment 1 of the present invention. The railway vehicle air-conditioning device 50 in Embodiment 1 has two refrigerant circuits that are a refrigerant circuit 10A and a refrigerant circuit 10B. The refrigerant circuit 10A is configured by connecting a compressor 11A, a switching device 17A, a heat source side heat exchanger 12A, a decompression device 13A and a load side heat exchanger 14A with a refrigerant pipe, so that refrigerant is circulated. Further, the refrigerant circuit 10B is configured by connecting a compressor 11B, a switching device 17B, a heat source side heat exchanger 12B, a decompression device 13B and a load side heat exchanger 14B with a refrigerant pipe, so that refrigerant is circulated. The railway vehicle air-conditioning device 50 of Embodiment 1 has two refrigerant circuits 10, but a number of refrigerant circuits 10 is not limited.

For example, in the railway vehicle air-conditioning device 50, start and stop (drive and stop driving) of the compressor 11 are repeated more frequently than in an air-conditioning device that is installed in a building or other places. Therefore, a burden imposed on the devices configuring the refrigerant circuit 10 is heavy. Thus, with life span of the devices taken into consideration, the railway vehicle air-conditioning device 50 has the plurality of refrigerant circuits 10. An operation is performed so that operating times of the respective refrigerant circuits become uniform, and the burden is reduced.

As for the refrigerant which circulates in the refrigerant circuit 10, for example, a zeotropic refrigerant mixture/non-azeotropic refrigerant mixture, a near-azeotropic refrigerant mixture, single refrigerant or the like can be used. As a zeotropic refrigerant mixture/non-azeotropic refrigerant mixture, for example, R4070 (R32, R125, R134a) and the like that are HFC (hydrofluorocarbon) refrigerants are cited. As near-azeotropic refrigerant mixture, for example, R410A (R32, R125), R404A (R125, R143a, R134a) and the like that are HFC refrigerants are cited. As single refrigerant, for example, R22 that is HCFC (hydrochlorofluorocarbon) refrigerant, R134a that is HFC refrigerant and other refrigerants are cited.

The compressor 11 sucks refrigerant, compresses the refrigerant to bring the refrigerant into a high-temperature and high-pressure state to discharge the refrigerant. The compressor 11 of the present embodiment is, for example, a compressor of a type that controls a driving rotation speed by an inverter circuit or other circuits, and can adjust a discharge amount of refrigerant. The switching device 17 is, for example, a device configured by a four-way valve or other valves. The switching device 17 switches a flow of refrigerant in a cooling operation time and a heating operation time.

The heat source side heat exchanger 12 exchanges heat between the refrigerant and air (air outside the railway vehicle). For example, the heat source side heat exchanger 12 functions as an evaporator in the heating operation time, exchanges heat between low-pressure refrigerant flowing in via the decompression device 13 and air, evaporates the refrigerant, and vaporizes the refrigerant. Further, the heat source side heat exchanger 12 functions as a condenser (including a gas cooler, and the same shall apply hereinafter) in the cooling operation time, exchanges heat between the refrigerant flowing in from the switching device 17 side and compressed in the compressor 11, and causes the refrigerant to transfer heat. Here, the refrigerant is condensed and liquefied by heat transfer.

The decompression device 13 decompresses the refrigerant to expand the refrigerant. The decompression device 13 is configured by, for example, a capillary (capillary tube), a flow rate control unit such as an electronic expansion valve, a refrigerant flow rate adjustment unit such as an expansion valve having a temperature sensitive cylinder, or other units. The load side heat exchanger 14 exchanges heat between the refrigerant and air in the vehicle. For example, the load side heat exchanger 14 functions as a condenser in the heating operation time, condenses the refrigerant from the compressor 11, and heats air. On the other hand, the load side heat exchanger 14 functions as an evaporator in the cooling operation time, exchanges heat between the refrigerant which is brought into a low-pressure state by the decompression device 13 and air, evaporates the refrigerant to vaporize the refrigerant, and cools air.

In the heat source side heat exchanger 12A at a refrigerant circuit 10A side, a heat source side fan 15A is installed. In the heat source side heat exchanger 12B at a refrigerant circuit 10B side, a heat source side fan 15B is installed. In the heat source side fan 15, the fan rotates by a fan motor 15a being driven, and air outside the vehicle is passed to the heat source side heat exchanger 12. In a load side fan 16, the fan rotates by a fan motor 16a being driven, air in the railway vehicle is passed to the load side heat exchanger 14, and air that is air-conditioned is fed into the railway vehicle. The load side fan 16 in Embodiment 1 is installed in common to the plurality of refrigerant circuits 10.

Further, a heat source side filter 18 for removing foreign matters and the like included in a fluid that is supplied to the heat source side heat exchanger 12 by the heat source side fan 15 is provided between the heat source side heat exchanger 12 and the heat source side fan 15. A load side filter 19 for removing foreign matters and the like included in the fluid that is supplied to the load side heat exchanger 14 by the load side fan 16 is provided between the load side heat exchanger 14 and the load side fan 16.

Further, in the refrigerant circuit 10, a pressure sensor 21 and a temperature sensor 22 are installed. The pressure sensor 21 is installed at a suction side of the compressor 11, detects a suction pressure that is a pressure of the refrigerant to be sucked by the compressor 11, and sends a signal including a detected value to the vehicle air conditioning control device 20. The temperature sensor 22 is installed at a refrigerant outflow side at a time of the load side heat exchanger 14 functioning as an evaporator, for example, to detect a temperature, and sends a signal including a detected value to the vehicle air conditioning control device 20.

Next, operations and the like in respective composing devices of the refrigerant circuit 10 will be described based on the flow of the refrigerant circulating in the refrigerant circuit 10 in a cooling operation and a heating operation of the railway vehicle air-conditioning device 50. First, a cooling operation will be described. The compressor 11 sucks the refrigerant, compresses the refrigerant and brings the refrigerant into a high-temperature/high-pressure state to discharge the refrigerant. The discharged refrigerant flows into the heat source side heat exchanger 12 via the switching device 17. The heat source side heat exchanger 12 exchanges heat between air outside the vehicle that is supplied by the heat source side fan 15 and the refrigerant, and condenses and liquefies the refrigerant. The condensed and liquefied refrigerant passes through the decompression device 13. The decompression device 13 decompresses the condensed and liquefied refrigerant passing through the decompression device 13. The decompressed refrigerant flows into the load side heat exchanger 14. The load side heat exchanger 14 exchanges heat between air inside the vehicle that is supplied by the load side fan 16 and the refrigerant, and evaporates and gasifies the refrigerant. Subsequently, the compressor 11 sucks the evaporated and gasified refrigerant that passes through the switching device 17 again.

Next, a heating operation will be described. The compressor 11 sucks the refrigerant, and compresses the refrigerant to bring the refrigerant into a high-temperature/high-pressure state to discharge the refrigerant. The discharged refrigerant flows into the load side heat exchanger 14 via the switching device 17. The load side heat exchanger 14 exchanges heat between the air in the vehicle that is supplied by the load side fan 16 and the refrigerant, and condenses and liquefies the refrigerant. The condensed and liquefied refrigerant passes through the decompression device 13. The decompression device 13 decompresses the condensed and liquefied refrigerant that passes through the decompression device 13. The decompressed refrigerant flows into the heat source side heat exchanger 12. The heat source side heat exchanger 12 exchanges heat between the air outside the vehicle that is supplied by the heat source side fan 15 and the refrigerant, and evaporates and gasifies the refrigerant. Subsequently, the compressor 11 sucks the evaporated and gasified refrigerant that passes through the switching device 17 again.

Next, acquisition of data showing the operating state in the vehicle air conditioning data will be described. The vehicle air conditioning control device 20 causes the railway vehicle air-conditioning device 50 to perform a special operation, for example, in a vacant state without passengers before starting commercial operation of the train or the like. The vehicle air conditioning control device 20 records the vehicle air conditioning storage device 30 the vehicle air conditioning data obtained in the special operation. The special operation is, for example, an operation performed by the refrigerant circuit 10 by driving the compressor 11, the heat source side fan 15, and the load side fan 16 with patterns set in advance of the driving frequency of the compressor 11, a fan rotation speed of the heat source side fan 15, a fun rotation speed of the load side fan 16 and the like, such as driving the compressor 11 with the driving frequencies of two steps of 30 Hz and 70 Hz. By performing the special operation by fixing the set temperature in the railway vehicle 1, the operating state and the like of the devices other than the devices that are driven with the patterns set in advance, determination of an abnormal state, specifying the device in an abnormal state and the like can be performed. Here, it is more preferable to cause the railway vehicle air-conditioning device 50 to perform the special operation without being influenced by external disturbance such as wind or the like by movement, as in stopping in the depot or other places.

For example, when the train commercially operates, passenger load factors in the railway vehicles 1 are different, e.g. many passengers riding on the railway vehicles 1 near the stairs. Therefore, air conditioning loads in the railway vehicle air-conditioning devices 50 of the respective railway vehicles 1 are different. Since the special operation is performed when no passenger is in the vehicle, the load factors of the respective railway vehicles 1 are the same, i.e. zero. With respect to the railway vehicle air-conditioning devices 50 of a plurality of railway vehicles 1 in the same train composition, vehicle air conditioning data obtained by operating under same operation conditions under operations or the like in the same environmental conditions, and the same time period. Consequently, for example, when the abnormal state determination processing is performed for the railway vehicle air-conditioning device 50 of the railway vehicle 1 that is an object of determination, the number of data to be referenced to perform comparison, calculation of a threshold value and the like can be increased.

Here, for example, a switch or the like that instructs the special operation may be installed in an operator's seat, and the special operation may be enabled to be instructed to the vehicle air conditioning control device 20. Subsequently, the special operation is performed by the human instruction, and the vehicle air conditioning data are recorded. Further, for example, the special operation of the railway vehicle air-conditioning device 50 may be automatically performed at every fixed time and the vehicle air conditioning data may be recorded.

Not only the vehicle air conditioning data in the special operation, but also the vehicle air conditioning data of the railway vehicle 1 in a normal operation at a time of the train performing a commercial operation may be recorded.

Next, management of the vehicle air conditioning data in the management device 100 will be described. The management device 100 records the vehicle air conditioning data in the railway vehicle air-conditioning devices 50 of the respective railway vehicles 1 in the vehicle air conditioning data recording unit 141 of the management storage device 140 and manages the vehicle air conditioning data. The plurality of railway vehicles 1 is operated under various environmental conditions in which operating times, operating distances and the like are different. Accordingly, in the management device 100, various vehicle air conditioning data obtained in various environmental conditions and operation conditions are collected as so-called big data and recorded.

The management control device 120 uses the vehicle air conditioning data for reference when performing abnormal state determination processing or the like to the railway vehicle air-conditioning device 50 of a certain railway vehicle 1 which is an object, for example. At this time, the management control device 120 searches for the vehicle air conditioning data that are obtained by operation under the analogous (including the same) conditions such as environmental conditions, and the operation conditions, from the vehicle air conditioning data recorded in the vehicle air conditioning data recording unit 141 of the management storage device 140, and determines the vehicle air conditioning data as the vehicle air conditioning data for reference. Here, the vehicle air conditioning data for reference may be grouped in advance and recorded, and may be used when processing is performed.

Figure 3:
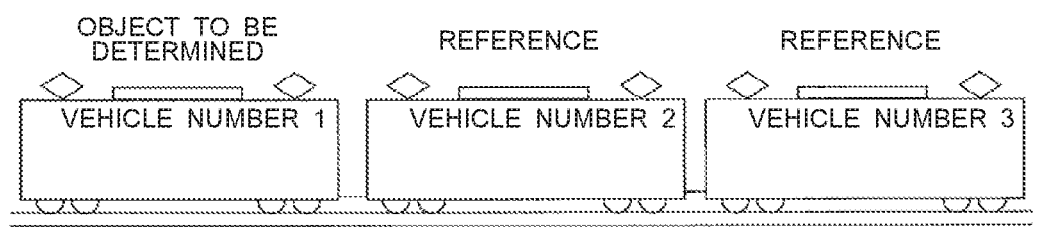
FIG. 3 is a diagram explaining a railway vehicle 1 relating to determination of vehicle air conditioning data for reference in Embodiment 1 of the present invention.

FIG. 3 is a diagram explaining the railway vehicles 1 relating to determination of the vehicle air conditioning data for reference in Embodiment 1 of the present invention. For example, the vehicle air conditioning data relating to the railway vehicle air-conditioning devices 50 of a plurality of railway vehicles 1 of the same train composition operated under the same environmental conditions, and the same operation conditions such as operation in the same time period in the aforementioned special operation, a commercial operation and the like are determined as the vehicle air conditioning data for reference.

Figure 4:
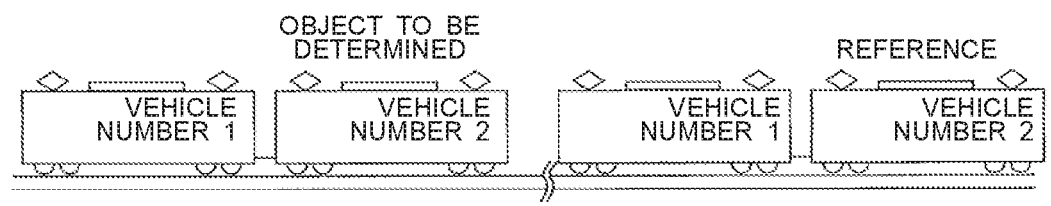
FIG. 4 is a diagram explaining the railway vehicle 1 relating to determination of another vehicle air conditioning data for reference in Embodiment 1 of the present invention.

FIG. 4 is a diagram explaining the railway vehicles 1 relating to determination of other vehicle air conditioning data for reference in Embodiment 1 of the present invention. For example, the vehicle air conditioning data for reference may be determined from the vehicle air conditioning data in a normal operation at the time of the railway vehicles 1 performing a commercial operation. In this case, the vehicle air conditioning data relating to the railway vehicle air-conditioning devices 50 of the railway vehicles 1 of the same vehicle numbers in other train compositions differing in departure time in the same route are determined. For example, the railway vehicle 1 that stops in a vicinity of a stair of a station and the railway vehicle 1 that does not stop in the vicinity of the stair of the station differ in load factor. Thus, the vehicle air conditioning data relating to the railway vehicle air-conditioning devices 50 of the railway vehicles 1 of the same vehicle numbers in other train compositions differing in departure time and analogous in load factor are determined as the vehicle air conditioning data for reference.

Besides, for example, in order to strictly select the air conditioning data that can be used for reference, vehicle air conditioning data relating to the railway vehicle air-conditioning devices 50 of the railway vehicles 1 with the year of manufacture being same in a predetermined range (for example, one year before and after) as the railway vehicle 1 to be an object of abnormal state determination processing may be determined as the vehicle air conditioning data for reference. Further, vehicle air conditioning data relating to the railway vehicle air-conditioning devices 50 of the railway vehicles 1 with continuous operating times after repair (maintenance) being the same in a predetermined range as a certain railway vehicle 1 to be an object for determining an abnormal state may be determined as the vehicle air conditioning data for reference. Determination of the vehicle air conditioning data for reference is not specially limited to these methods described above.

As described above, according to the railway vehicle air conditioning management system of Embodiment 1, the vehicle air conditioning data collected from many railway vehicles 1 are recorded in the vehicle air conditioning data recording unit 141, so that many vehicle air conditioning data in which the conditions such as the environmental conditions and the operation conditions are analogous can be recorded. Accordingly, for example, the vehicle air conditioning data which are referenced when the management control device 120 performs abnormal state determination processing and the like can be increased. Consequently, precision of abnormal state determination and the like can be enhanced.

By operating the railway vehicle air-conditioning devices 50 under the same environmental conditions and the same operation conditions, e.g. the service time or the like, by causing the railway vehicle air-conditioning devices 50 to perform the special operation in the state without passengers, for example, the vehicle air conditioning data relating to the railway vehicle air-conditioning devices 50 of the plurality of railway vehicles 1 in the same train composition can be used in the vehicle air conditioning data for reference.

Further, with respect to the vehicle air conditioning data in the normal operation at the time of the railway vehicle 1 performing a commercial operation, by using the vehicle air conditioning data relating to the railway vehicle air-conditioning devices 50 of the railway vehicles 1 of the same vehicle numbers in other train car compositions different in departure time in the same route, the vehicle air conditioning data with similar load factors can be used.

Embodiment 2

In Embodiment 1 described above, processing of the management control device 120 causing the management storage device 140 to record the vehicle air conditioning data in the railway vehicle air-conditioning devices 50 of the plurality of railway vehicles 1 in the management device 100 is described. Here, abnormal state determination processing using the vehicle air conditioning data in a plurality of railway vehicles 1 will be described. In particular, in Embodiment 2, abnormal state determination processing is performed based on changes in pressure, temperature and the like of the refrigerant circuit 10 at a time of the compressor 11 being actuated.

The railway vehicle air-conditioning device 50 repeats drive or stop of drive (hereinafter, referred to as start and stop) of the compressor 11 more frequently than air-conditioning devices installed in buildings or other places, for the reason of switch of supply of power or the like. Here, for example, when the refrigerant is not evaporated in the evaporator and a degree of superheat of the refrigerant at a refrigerant outflow side of the evaporator is low at a time of actuation of the compressor 11 or the like, liquid back that is a phenomenon that liquid refrigerant or two-phase gas-liquid refrigerant is sucked by the compressor 11 and returns is generated. When liquid back occurs, the compressor 11 tends to compress the liquid refrigerant with high density in the compressor 11 and the compressor 11 may be broken. Therefore, in order to determine an abnormal state relating to liquid back, for example, abnormal state determination processing is performed based on changes in pressure, temperature and the like of the refrigerant circuit 10 at the time of the compressor 11 being actuated.

Figure 5:
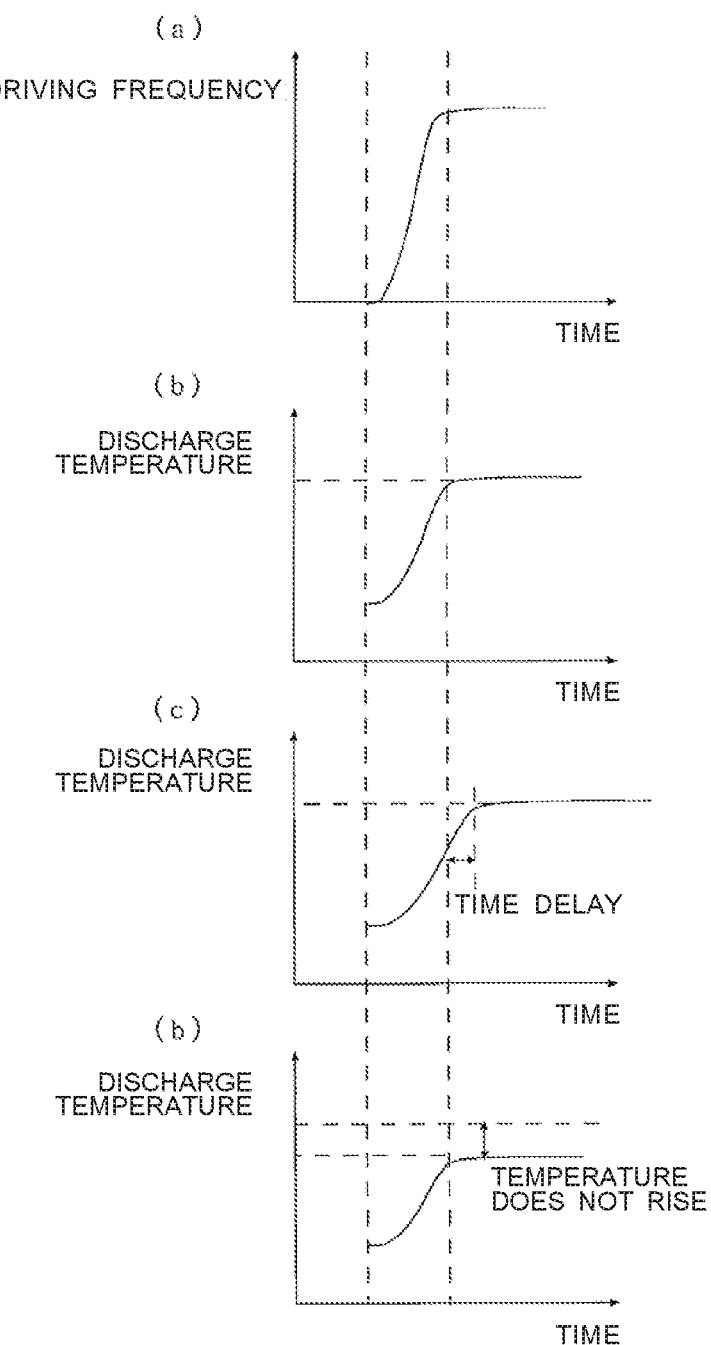
FIG. 5 is a diagram explaining vehicle air conditioning data relating to abnormal state determination processing that is performed by an abnormal state determination unit 121 of a management control device 120 of a management device 100 according to Embodiment 2 of the present invention.

FIG. 5 is a diagram explaining vehicle air conditioning data relating to abnormal state determination processing that is performed by the abnormal state determination unit 121 of the management control device 120 of the management device 100 according to Embodiment 2 of the present invention. FIG. 5 illustrates a relationship between a temporal change of the driving frequency at the time of the compressor 11 being actuated and temporal changes of corresponding discharge temperatures. Here, the changes of the driving frequency and the discharge temperatures for approximately three minutes after the compressor 11 is actuated are illustrated.

For example, when the refrigerant circuit 10 in the railway vehicle air-conditioning device 50 normally operates, the discharge temperature changes as illustrated in FIG. 5(b), relative to the change in the driving frequency of the compressor 11 as illustrated in FIG. 5(a). However, when liquid back occurs, a time until the discharge temperature is stabilized is delayed as illustrated in FIG. 5(c), or the discharge temperature does not rise as illustrated in FIG. 5(d). Accordingly, if the discharge temperature of the compressor 11 does not reach a predetermined temperature at a predetermined time when the compressor 11 is actuated, it can be determined as an abnormal state.

When the abnormal state determination unit 121 performs determination, a set time period for determination and a set temperature for determination to be threshold values that are used as determination references are determined in advance. When the abnormal state determination unit 121 determines that the discharge temperature of the compressor 11 is lower than the set temperature for determination when the set time period for determination elapses after the compressor 11 is actuated, the abnormal state determination unit 121 determines it as an abnormal state.

Concerning determination of the threshold values such as the set time period for determination and the set temperature for determination to be the references of the abnormal state determination processing, the management arithmetic operation device 130 calculates average values based on the vehicle air conditioning data for reference which are determined, and sets the obtained average values as the threshold values, for example, as described in Embodiment 1. However, determination of the threshold values is not limited to this determination procedure.

Here, the abnormal state determination processing is performed in the abnormal state determination unit 121 of the management device 100. However, for example, the management device 100 may cause the vehicle air conditioning storage devices 30 of the respective railway vehicle air-conditioning devices 50 to store data on the set time periods for determination and the set temperatures for determination corresponding to the railway vehicle air-conditioning devices 50 of the respective railway vehicles 1 that are determined, and the vehicle air conditioning control device 20 may perform the abnormal state determination processing.

As described above, according to the railway vehicle air conditioning management system of Embodiment 2, abnormality determination processing is performed in accordance with the determination references determined based on the vehicle air conditioning data obtained from many railway vehicles 1, so that abnormality determination processing with high precision can be performed based on more data.

Further, the abnormality determination processing is performed based on the data on the pressure, the temperature and the like detected after actuation of the compressor 11, and thereby many abnormalities of the railway vehicle air-conditioning device 50 can be determined. The abnormality determination processing is performed based on the discharge temperature after actuation of the compressor 11, so that liquid back frequently generated in the railway vehicle air-conditioning device 50 can be determined.

Embodiment 3

In Embodiment 2 described above, determination of abnormality state relating to liquid back to the compressor 11 is described. The railway vehicle air-conditioning device 50 can perform the special operation for determining the abnormal state of the devices or the like. In the special operation, for example, a cooling operation or a heating operation is performed, and the set temperature to indoor air is brought into a fixed state. A spot in an abnormal state can be determined, based on the values detected by the respective sensors and obtained when the operating state of the device that is controlled by the vehicle air conditioning control device 20 is changed by changing the pattern from a first state to a second state.

In Embodiment 3, another example of determination of an abnormal state will be described. Here, in the following explanation, explanation will be made on the assumption that the management control device 120 performs the abnormal state determination processing as described in Embodiment 2. Further, the device such as the compressor 11 the drive of which is controlled in accordance with the pattern set in advance by the vehicle air conditioning control device 20 is properly referred to as an "element device".

(Separation of Spots in Abnormal State)

For example, when the railway vehicle air-conditioning device 50 is in an abnormal state, a cause of the abnormal state relating to abnormal states of various sensors, and a cause of the abnormal state relating to abnormal states of the various devices configuring the refrigerant circuit 10 can be distinguished from each other.

As for such separation of the abnormal states, abnormal states can be estimated based on states of values detected by the various sensors when the operating state of the element device is changed from the first state to the second state. Specifically, in a case where the values detected by the various sensors do not change when the operating state of the element device is changed, the case can be determined as the abnormal states of the sensors such as sensor deterioration and sensor removal.

(Determination of Abnormal Spot)

Further, in the special operation, by changing the operating state of one device out of the element devices, and fixing the operating states of the remaining devices, an abnormal state can be determined, and the device in the abnormal state can be specified. As the element devices in the railway vehicle air-conditioning device 50 at this time, for example, the compressor 11, the decompression device 13 as the expansion valve, the heat source side fan 15, the load side fan 16 and other devices are cited.

For example, when the driving state of the compressor 11 is changed, the driving frequency is changed. By changing the driving frequency of the compressor 11, an abnormality of the decompression device 13 as the expansion valve, for example, can be detected. Further, for example, when an operating state of the decompression device 13 as the expansion valve is changed, a valve opening degree is changed. Further, by changing the valve opening degree of the decompression device 13, an abnormality of the compressor 11 can be detected, for example.

Further, for example, when the driving state of the heat source side fan 15 or the load side fan 16 is changed, a rotation speed of the fan is changed. By changing the rotation speed of the heat source side fan 15, the abnormal states of, for example, the heat source side fan 15, the heat source side heat exchanger 12 and the like can be determined. Further, by changing the rotation speed of the load side fan 16, the abnormal states of, for example, the load side fan 16, the load side heat exchanger 14 and the like can be determined.

(Case of Changing Driving Frequency of Compressor 11)

Next, a specific example of specifying a spot in an abnormal state by a special operation will be described. When the driving frequency of the compressor 11 is changed, an abnormal state in which the valve of the decompression device 13 does not normally operate can be determined.

Here, in a following example, a case where the decompression device 13 is an expansion valve that expands refrigerant by adjusting the opening degree of the valve will be described. Further, the valve opening degree of the decompression device 13 is controlled by the vehicle air conditioning control device 20 so that a degree of superheat in the load side heat exchanger 14 reaches a temperature set in advance, for example, 4 degrees C. at the cooling operation time.

Figure 6:
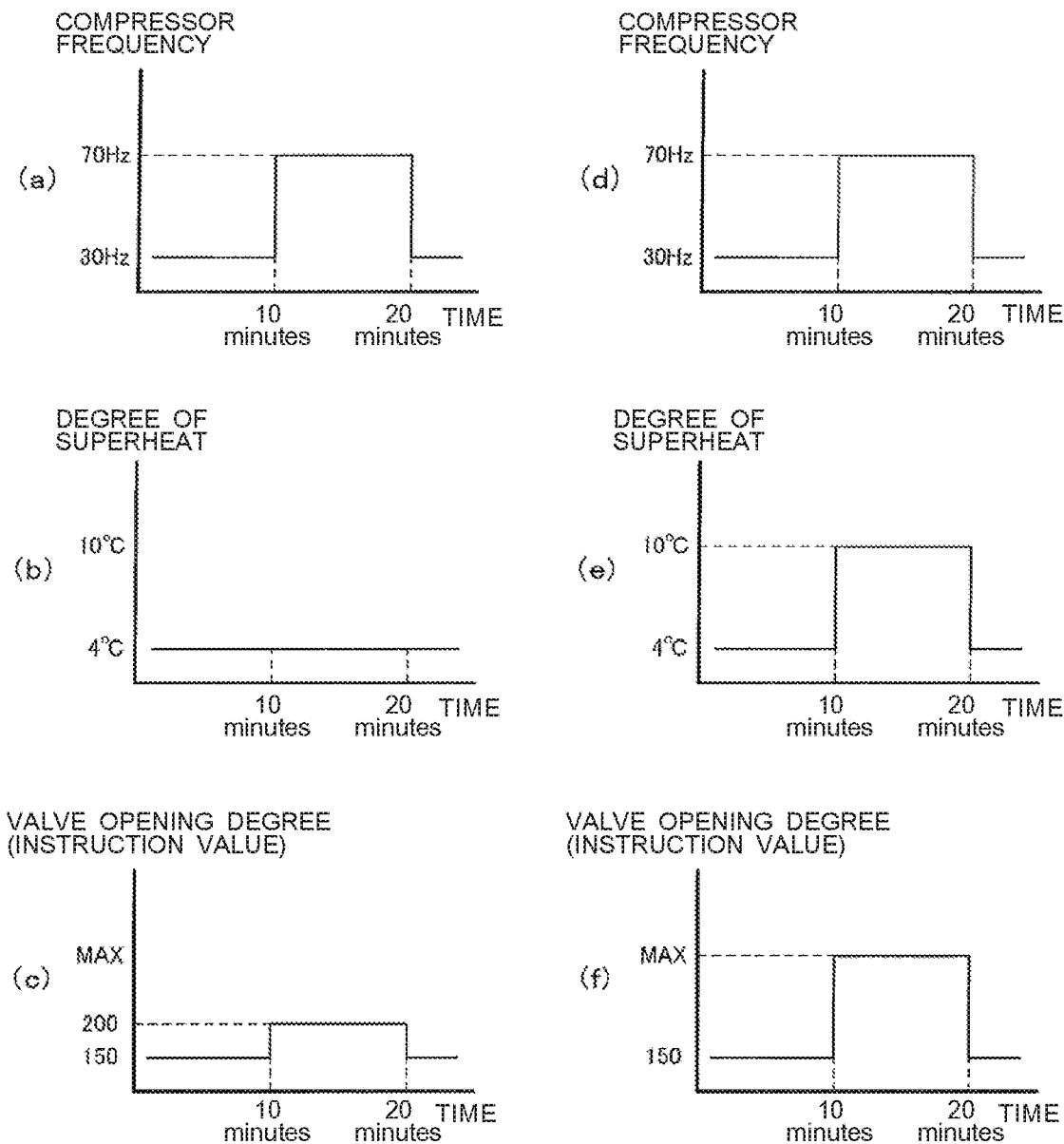
FIG. 6 is a schematic diagram illustrating examples of states of various parameters in a case where a driving frequency of a compressor 11 is changed according to Embodiment 3 of the present invention.

FIG. 6 is a schematic diagram illustrating examples of states of various parameters in a case where the driving frequency of the compressor 11 is changed according to Embodiment 3 of the present invention. FIG. 6(a) to FIG. 6(c) illustrate states of various parameters in a case where the railway vehicle air-conditioning device 50 normally operates.

FIG. 6(a) illustrates a state of the driving frequency of the compressor 11 set in the special operation. In this example, the driving frequency of the compressor 11 is changed to 70 Hz from 30 Hz at time intervals set in advance, for example, at intervals of 10 minutes. FIG. 6(b) illustrates a state of a degree of superheat in the load side heat exchanger 14 in a case where the driving frequency of the compressor 11 is changed as illustrated in FIG. 6(a). FIG. 6(c) illustrates a state of an instruction value of a valve opening degree to the decompression device 13 by the vehicle air conditioning control device 20 in a case where the driving frequency of the compressor 11 is changed as illustrated in FIG. 6(a).

Further, FIG. 6(d) to FIG. 6(f) illustrate the states of the various parameters in a case where the railway vehicle air-conditioning device 50 does not normally operate because an abnormality is generated in the decompression device 13.

FIG. 6(d) illustrates the state of the driving frequency of the compressor 11 set in the special operation, as in the case of FIG. 6(a). FIG. 6(e) illustrates a state of the degree of superheat in the load side heat exchanger 14 in the case where the driving frequency of the compressor 11 is changed as illustrated in FIG. 6(d). FIG. 6(f) illustrates a state of the instruction value of the valve opening degree to the decompression device 13 by the vehicle air conditioning control device 20 in the case where the driving frequency of the compressor 11 is changed as illustrated in FIG. 6(d).

When the driving frequency of the compressor 11 is changed as illustrated in FIG. 6(a) when the railway vehicle air-conditioning device 50 normally operates, the vehicle air conditioning control device 20 controls the valve opening degree of the decompression device 13 so that the degree of superheat in the load side heat exchanger 14 is always at 4 degrees C.

Here, when the driving frequency of the compressor 11 is increased in the state where the degree of superheat is controlled to be at a constant temperature, it is necessary to increase the valve opening degree of the decompression device 13. Consequently, the vehicle air conditioning control device 20 controls the decompression device 13 to increase the valve opening degree of the decompression device 13 at the timing when the driving frequency increases, as illustrated in FIG. 6(c). Thereby, the degree of superheat is always kept at 4 degrees C. as illustrated in FIG. 6(b).

The degree of superheat in the load side heat exchanger 14 can be calculated by subtracting a saturation temperature in a pressure detected by the pressure sensor 21 from a temperature detected by the temperature sensor 22.

When an abnormality is generated in the railway vehicle air-conditioning device 50, if the driving frequency of the compressor 11 is changed as illustrated in FIG. 6(d), the vehicle air conditioning control device 20 controls the valve opening degree of the decompression device 13 so that the degree of superheat is always at 4 degrees C. However, in this example, the degree of superheat increases to 10 degrees C. because the valve of the decompression device 13 does not normally operate. Consequently, the vehicle air conditioning control device 20 controls the valve opening degree to further increase the valve opening degree. As a result, the instruction value of the valve opening degree by the vehicle air conditioning control device 20 finally becomes the maximum.

In this way, when an abnormality is generated in the railway vehicle air-conditioning device 50, and the cause of the abnormality is in the decompression device 13, differences are generated in the state of the degree of superheat in the load side heat exchanger 14 and the instruction value of the valve opening degree to the decompression device 13 by the vehicle air conditioning control device 20, as compared with the case of the railway vehicle air-conditioning device 50 that normally operates.

Accordingly, the special operation is carried out when an abnormality is generated in the railway vehicle air-conditioning device 50, and when differences are recognized in the state of the degree of superheat and the instruction value of the valve opening degree, as compared with the normal operation time, it can be determined that an abnormality is generated in the decompression device 13.

At the heating operation time, the state of the degree of superheat in the heat source side heat exchanger 12 and the instruction value of the valve opening degree of the decompression device 13 are confirmed in the state where the degree of superheat of the heat source side heat exchanger 12 is controlled to be constant, and thereby an abnormality of the decompression device 13 can be similarly detected.

Further, in this example, an abnormality of the decompression device 13 is determined based on the degree of superheat of the load side heat exchanger 14 and the instruction value of the valve opening degree to the decompression device 13, but determination of abnormality of the decompression device 13 is not limited to this example. For example, in Embodiment 3, an abnormality of the decompression device 13 can also be determined based on only the instruction value of the valve opening degree to the decompression device 13. This is because when an abnormality is generated in the decompression device 13, the degree of superheat similarly changes in accordance with the change of the instruction value of the valve opening degree, in such a manner that when the instruction value of the valve opening degree to the decompression device 13 increases, the degree of superheat of the load side heat exchanger 14 also increases following this.

(Case of Changing Rotation Speed of Fan)

Next, a method for detecting an abnormality when the rotation speed of the load side fan 16 is changed will be described. When the rotation speed of the load side fan 16 is changed, abnormalities of, for example, the fan motor 16*a* driving the load side fan 16, the load side filter 19 between the load side heat exchanger 14 and the load side fan 16, the load side heat exchanger 14 and the like can be detected.

In the following example, a case of causing the railway vehicle air-conditioning device 50 to perform a cooling operation is assumed. Accordingly, explanation will be made on the assumption that the load side heat exchanger 14 functions as an evaporator. Further, in this example, the valve opening degree of the decompression device 13 is controlled by the vehicle air conditioning control device 20 so that the degree of superheat in the load side heat exchanger 14 reaches 4 degrees C. at the cooling operation time.

(Normal Operation Time)

Figure 7:
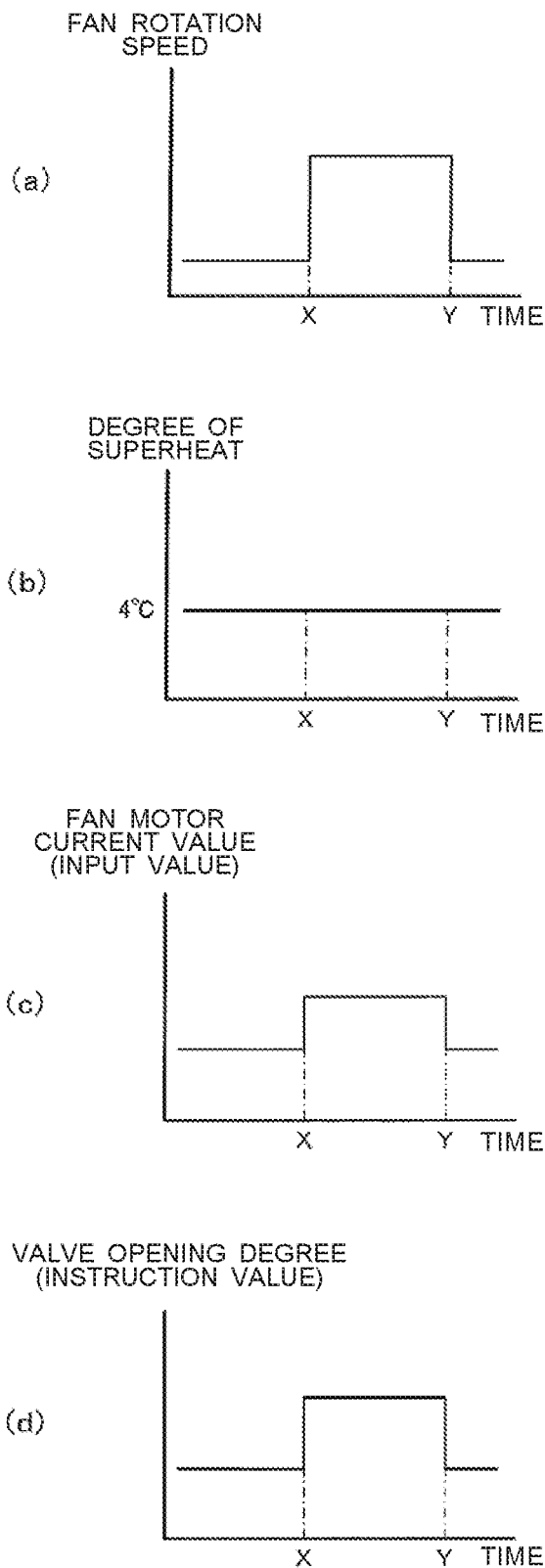
FIG. 7 is a schematic diagram illustrating examples of states of various parameters at a time of a rotation speed of a load side fan 16 being changed when the railway vehicle air-conditioning device 50 in FIG. 1 and FIG. 2 normally operates.

First, the case where the railway vehicle air-conditioning device 50 normally operates will be described. FIG. 7 is a schematic diagram illustrating examples of states of various parameters at a time of the rotation speed of the load side fan 16 being changed when the railway vehicle air-conditioning device 50 in FIG. 1 and FIG. 2 normally operates.

FIG. 7(*a*) illustrates a state of a fan rotation speed of the load side fan 16 set in the special operation. In this example, the fan rotation speed of the load side fan 16 is increased at a time point X, and the fan rotation speed is returned to an original rotation speed at a time point Y. FIG. 7(*b*) illustrates a state of the degree of superheat in the load side heat exchanger 14 in a case where the fan rotation speed of the load side fan 16 is changed as illustrated in FIG. 7(*a*). FIG. 7(*c*) illustrates a state of a current value that is inputted to the fan motor 16*a* of the load side fan 16 in the case where the fan rotation speed of the load side fan 16 is changed as illustrated in FIG. 7(*a*). FIG. 7(*d*) illustrates a state of an instruction value of the valve opening degree to the decompression device 13 by the vehicle air conditioning control device 20 in the case where the fan rotation speed of the load side fan 16 is changed as illustrated in FIG. 7(*a*).

When the vehicle air conditioning control device 20 controls the fan rotation speed of the load side fan 16 to change the fan rotation speed as illustrated in FIG. 7(*a*) in the case where the railway vehicle air-conditioning device 50 normally operates, the vehicle air conditioning control device 20 controls the valve opening degree of the decompression device 13 so that the degree of superheat in the load side heat exchanger 14 is always at a temperature set in advance, simultaneously.

The vehicle air conditioning control device 20 controls the decompression device 13 to increase the valve opening degree of the decompression device 13 at the time point X at which the fan rotation speed increases, as illustrated in FIG. 7(*d*). Thereby, the degree of superheat in the load side heat exchanger 14 is always kept at the set temperature as illustrated in FIG. 7(*b*).

Further, the current value that is inputted to the fan motor 16*a* at this time changes in accordance with the fan rotation speed as illustrated in FIG. 7(*c*). Specifically, when the fan rotation speed increases, the current value of the fan motor 16*a* increases, whereas when the fan rotation speed decreases, the current value decreases.

(Fan Motor Abnormal Time)

Next, a case where the railway vehicle air-conditioning device 50 does not normally operate because an abnormality is generated in the fan motor 16*a* of the load side fan 16 will be described. In this example, a case where an abnormality is generated in the fan motor 16*a*, in particular, the fan motor 16*a* is deteriorated, and an estimated air amount cannot be obtained will be described.

Figure 8:
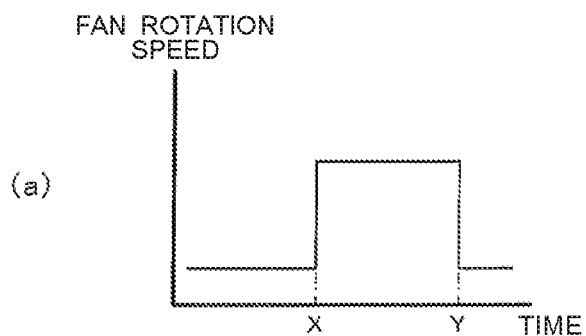
FIG. 8 is a schematic diagram illustrating first examples of states of various parameters at the time of the rotation speed of the load side fan 16 being changed when the railway vehicle air-conditioning device 50 in FIG. 1 and FIG. 2 does not normally operate.
Figure 8:
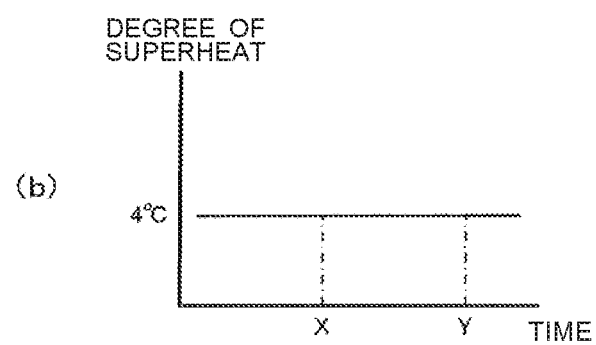
Figure 8:
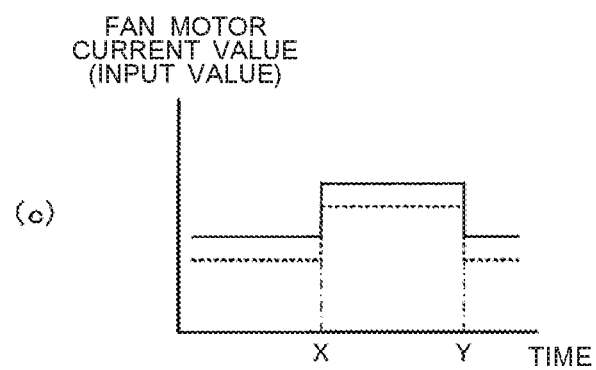
Figure 8:
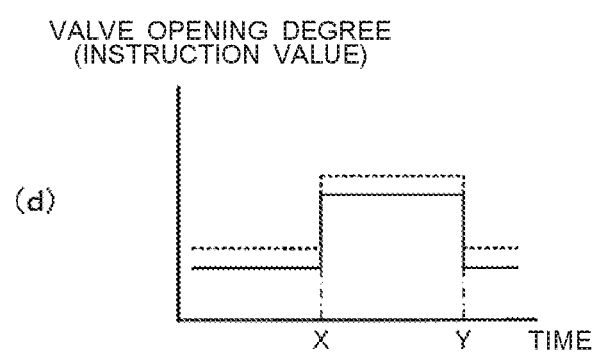

FIG. 8 is a schematic diagram illustrating a first example of states of various parameters at a time of the rotation speed of the load side fan 16 being changed when the railway vehicle air-conditioning device 50 in FIG. 1 and FIG. 2 does not normally operate. FIG. 8(*a*) illustrates a state of the fan rotation speed of the load side fan 16 set in the special operation. In this example, as in the case of the case illustrated in FIG. 7(*a*), the fan rotation speed of the load side fan 16 is increased at the time point X, and the fan rotation speed is returned to the original rotation speed at the time point Y.

FIG. 8(*b*) illustrates a state of the degree of superheat in the load side heat exchanger 14 in the case where the fan rotation speed of the load side fan 16 is changed as illustrated in FIG. 8(*a*). FIG. 8(*c*) illustrates a state of the current value that is inputted to the fan motor 16*a* of the load side fan 16 in the case where the fan rotation speed of the load side fan 16 is changed as illustrated in FIG. 8(*a*). FIG. 8(*d*) illustrates a state of the instruction value of the valve opening degree to the decompression device 13 by the vehicle air conditioning control device 20 in the case where the fan rotation speed of the load side fan 16 is changed as illustrated in FIG. 8(*a*). In FIG. 8(*c*) and FIG. 8(*d*), states illustrated by dotted lines show the states in the case where the railway vehicle air-conditioning device 50 normally operates.

In the case where the railway vehicle air-conditioning device 50 does not normally operate, the vehicle air conditioning control device 20 firstly controls the fan rotation speed of the load side fan 16 to change the fan rotation speed as illustrated in FIG. 8(*a*). At this time, in the load side fan 16, the fan motor 16*a* is deteriorated, so that the current value which is inputted to the fan motor 16*a* to change the fan rotation speed to an assumed rotation speed becomes larger than the current value at the time of normal operation as illustrated in FIG. 8(*c*).

Further, the vehicle air conditioning control device 20 controls the valve opening degree of the decompression device 13 so that the degree of superheat in the load side heat exchanger 14 is always at the temperature set in advance. At this time, the degree of superheat in the load side heat exchanger 14 is always kept at the set temperature as illustrated in FIG. 8(*b*), but due to deterioration of the fan motor 16*a*, the assumed air amount to the load side heat exchanger 14 cannot be sufficiently obtained, and the degree of superheat tends to reduce. Consequently, the vehicle air conditioning control device 20 controls the decompression device 13 to make the valve opening degree of the decompression device 13 smaller than the valve opening degree at the normal operation time as illustrated in FIG. 8(*d*).

In this way, when an abnormality is generated in the railway vehicle air-conditioning device 50, and the cause of the abnormality is in the fan motor 16*a* of the load side fan 16, differences are generated in the state of the input current value of the fan motor 16*a* in the load side fan 16, and the instruction value of the valve opening degree to the decompression device 13 by the vehicle air conditioning control device 20, as compared with the case of the railway vehicle air-conditioning device 50 that normally operates.

Accordingly, the special operation is carried out when an abnormality is generated in the railway vehicle air-conditioning device 50, the fan rotation speed of the load side fan 16 is changed, and when differences are recognized in the state of the input current value of the fan motor 16a and the instruction value of the valve opening degree as compared with the state of the input current value and the instruction value at the normal operation time, it can be determined that an abnormality is generated in the fan motor 16a.

(Filter Abnormal Time)

Next, a case where the railway vehicle air-conditioning device 50 does not normally operates because an abnormality is generated in the filter will be described. In this example, a case will be described, where an abnormality is generated in the load side filter 19 between the load side heat exchanger 14 and the load side fan 16, in particular, the load side filter 19 is clogged, and an assumed air amount is not obtained when a maximum air amount is attained by the load side fan 16.

Figure 9:
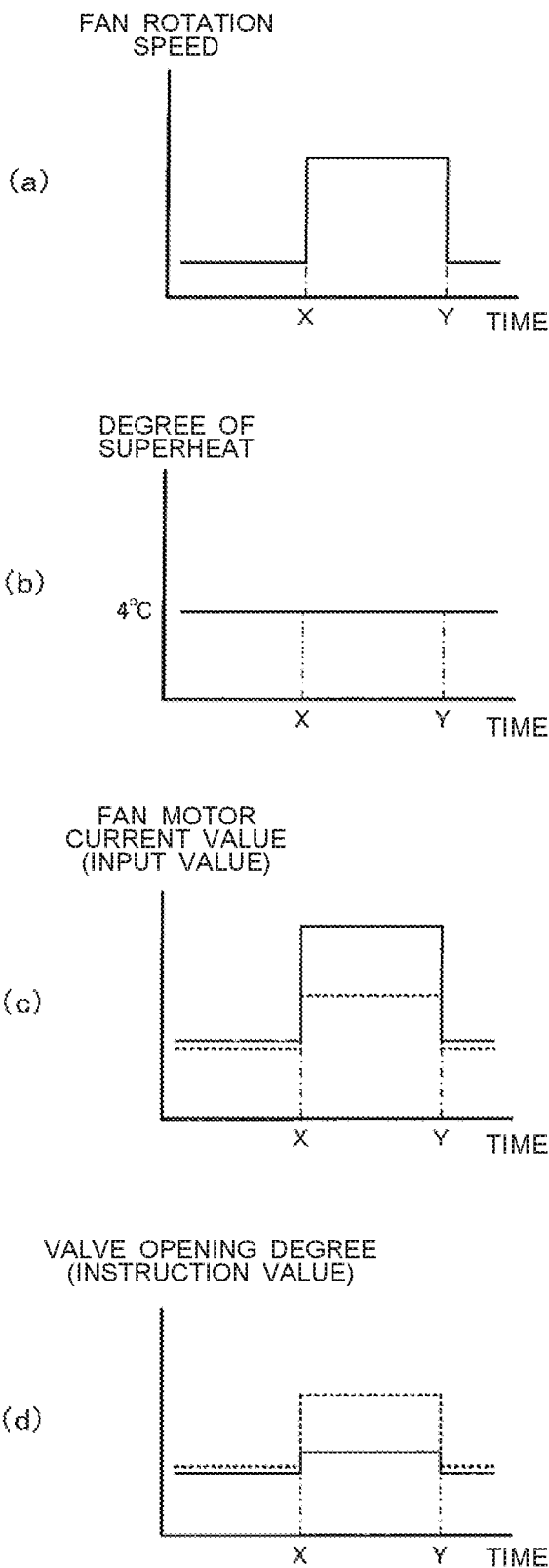
FIG. 9 is a schematic diagram illustrating second examples of the states of various parameters at the time of the rotation speed of the load side fan 16 being changed when the railway vehicle air-conditioning device 50 in FIG. 1 and FIG. 2 does not normally operate.

FIG. 9 is a schematic diagram illustrating a second example of states of various parameters at the time of the rotation speed of the load side fan 16 being changed when the railway vehicle air-conditioning device 50 in FIG. 1 and FIG. 2 does not normally operate. FIG. 9(*a*) illustrates a state of the fan rotation speed of the load side fan 16 set in the special operation. In this example, as in the cases illustrated in FIG. 7(*a*) and FIG. 8(*a*), the fan rotation speed of the load side fan 16 is increased at the time point X, and the fan rotation speed is returned to the original rotation speed at the time point Y.

FIG. 9(*b*) illustrates a state of the degree of superheat in the load side heat exchanger 14 in the case where the fan rotation speed of the load side fan 16 is changed as illustrated in FIG. 9(*a*). FIG. 9(*c*) illustrates a state of the current value that is inputted to the fan motor 16a for driving the load side fan 16 in the case where the fan rotation speed of the load side fan 16 is changed as illustrated in FIG. 9(*a*). FIG. 9(*d*) illustrates a state of the instruction value of the valve opening degree to the decompression device 13 by the vehicle air conditioning control device 20 in the case where the fan rotation speed of the load side fan 16 is changed as illustrated in FIG. 9(*a*). In FIG. 9(*c*) and FIG. 9(*d*), the states shown by the dotted lines show the states in the case where the railway vehicle air-conditioning device 50 normally operates.

When the railway vehicle air-conditioning device 50 does not normally operate, the vehicle air conditioning control device 20 firstly controls the fan rotation speed of the load side fan 16 to change the fan rotation speed as illustrated in FIG. 9(*a*). At this time, the load side filter 19 between the load side heat exchanger 14 and the load side fan 16 is clogged, so that when the fan rotation speed is large, it becomes difficult for wind to pass through the load side filter 19, and a sufficient amount of air cannot be supplied to the load side heat exchanger 14. Therefore, the air that cannot pass through the load side filter 19 becomes resistance to the load side fan 16, and the current value which is inputted to the fan motor 16a to change the fan rotation speed to the assumed rotation speed becomes larger than the current value at the normal operation time as illustrated in FIG. 9(*c*).

Further, the vehicle air conditioning control device 20 controls the valve opening degree of the decompression device 13 so that the degree of superheat in the load side heat exchanger 14 is always at the temperature set in advance. At this time, the degree of superheat in the load side heat exchanger 14 is always kept at a set temperature as illustrated in FIG. 9(*b*), but due to clogging of the load side filter 19, the assumed amount of air to the load side heat exchanger 14 is not sufficiently obtained, and the degree of superheat tends to reduce. Consequently, the vehicle air conditioning control device 20 controls the decompression device 13 to make the valve opening degree of the decompression device 13 smaller than the valve opening degree at the normal operation time, as illustrated in FIG. 9(*d*).

In this way, when an abnormality is generated in the railway vehicle air-conditioning device 50, and the cause of the abnormality is in the load side filter 19 between the load side heat exchanger 14 and the load side fan 16, differences are generated in the state of the input current value of the fan motor 16a in the load side fan 16 and the instruction value of the valve opening degree to the decompression device 13 by the vehicle air conditioning control device 20, as compared with the state of the input current value and the instruction value in the case of the railway vehicle air-conditioning device 50 that normally operates.

Accordingly, the special operation is carried out when an abnormality is generated in the railway vehicle air-conditioning device 50, the fan rotation speed of the load side fan 16 is changed, and when differences are recognized in the state of the input current value of the fan motor 16a and the instruction value of the valve opening degree as compared with the state of the input current value and the instruction value at the normal operation time, it can be determined that an abnormality is generated in the load side filter 19.

In both cases where an abnormality is generated in the fan motor 16a, and an abnormality is generated in the load side filter 19, abnormal spots are determined by confirming the state of the input current value of the fan motor 16a and the instruction value of the valve opening degree. Consequently, in this case, it is unlikely to reliably determine whether an abnormality is generated in the fan motor 16a or the load side filter 19.

However, a difference (refer to FIG. 9) between the current value that is inputted to the fan motor 16a when an abnormality is generated in the load side filter 19 and the current value at the normal operation time is larger than a difference (refer to FIG. 8) between the current value that is inputted to the fan motor 16a at a deterioration time of the fan motor 16a and the current value at the normal operation time. This is because it is more difficult to increase the fan rotation speed of the load side fan 16 when the load side filter 19 is clogged, as compared with the case where the fan motor 16a is deteriorated. Further, the same can be said of the difference between the instruction value of the valve opening degree in the case of an abnormality being generated in the load side filter 19 and the instruction value of the valve opening degree at the normal time, and the difference between the instruction value of the valve opening degree in the case of an abnormality being generated in the fan motor 16a and the instruction value of the valve opening degree at the normal time.

Accordingly, in Embodiment 3, it can be determined whether the cause of an abnormality is in the fan motor 16a or the load side filter 19 based on a magnitude of the difference from the normal time of each of the parameters.

(Heat Exchanger Abnormal Time)

Next, a case where the railway vehicle air-conditioning device 50 does not normally operate because an abnormality is generated in the load side heat exchanger 14 will be described. In this example, a case where an abnormality is generated in the load side heat exchanger 14, in particular, the heat exchanger is corroded, and heat cannot be exchanged between the refrigerant and indoor air will be described.

Figure 10:
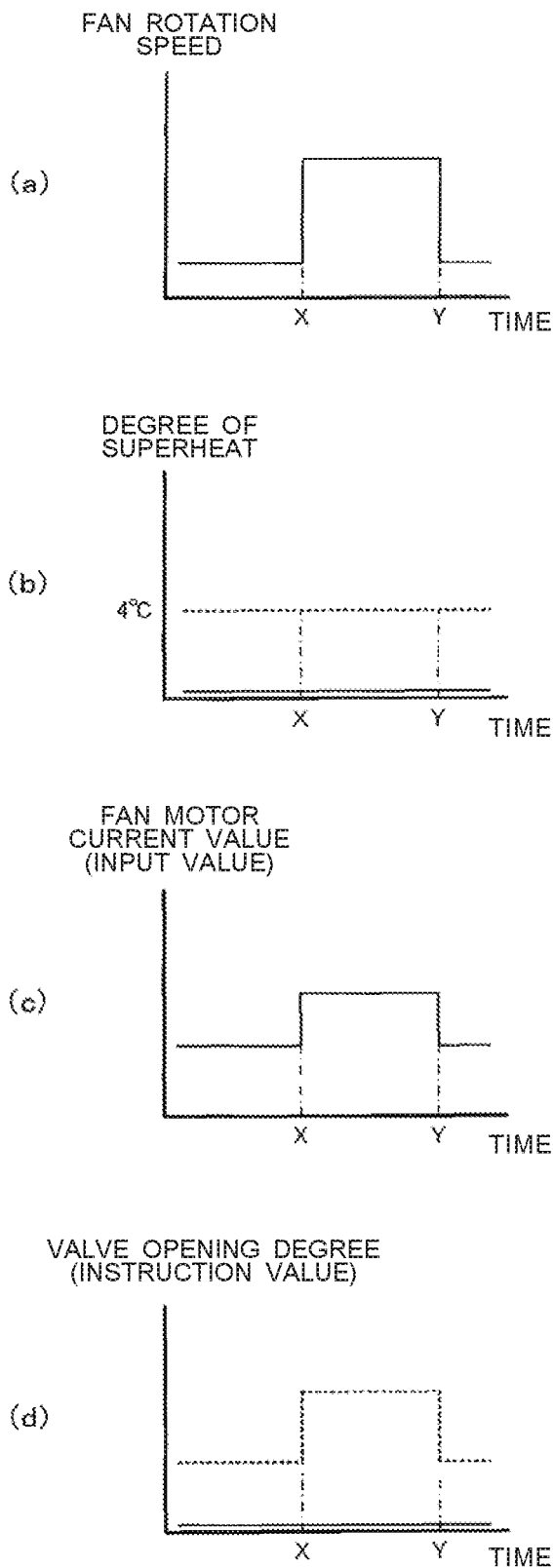
FIG. 10 is a schematic diagram illustrating third examples of the states of various parameters at the time of the rotation speed of the load side fan 16 being changed when the railway vehicle air-conditioning device 50 in FIG. 1 and FIG. 2 does not normally operate.

FIG. 10 is a schematic diagram illustrating a third example of states of various parameters at a time of the rotation speed of the load side fan 16 being changed when the railway vehicle air-conditioning device 50 in FIG. 1 and FIG. 2 does not normally operate. FIG. 10(a) illustrates a state of the fan rotation speed of the load side fan 16 set in the special operation. In this example, as in the case of the cases illustrated in FIG. 7(a), FIG. 8(a) and FIG. 9(a), the fan rotation speed of the load side fan 16 is increased at the time point X, and the fan rotation speed is returned to the original rotation speed at the time point Y.

FIG. 10(b) illustrates a state of the degree of superheat in the load side heat exchanger 14 in a case where the fan rotation speed of the load side fan 16 is changed as illustrated in FIG. 10(a). FIG. 10(c) illustrates a state of the current value that is inputted to the fan motor 16a for driving the load side fan 16 in the case where the fan rotation speed of the load side fan 16 is changed as illustrated in FIG. 10(a). FIG. 10(d) illustrates a state of the instruction value of the valve opening degree to the decompression device 13 by the vehicle air conditioning control device 20 in the case where the fan rotation speed of the load side fan 16 is changed as illustrated in FIG. 10(a). In FIG. 10(b) and FIG. 10(d), states shown by dotted lines show the states in the case where the railway vehicle air-conditioning device 50 normally operates.

When the railway vehicle air-conditioning device 50 does not normally operate, the vehicle air conditioning control device 20 firstly controls the fan rotation speed of the load side fan 16 to change the fan rotation speed as illustrated in FIG. 10(a). The current value that is inputted to the fan motor 16a at this time is a value similar to the value at the normal operation time as illustrated in FIG. 10(c).

Further, the vehicle air conditioning control device 20 controls the valve opening degree of the decompression device 13 so that the degree of superheat in the load side heat exchanger 14 is always at a temperature set in advance. However, in this case, heat cannot be exchanged in the load side heat exchanger 14, so that the degree of superheat in the load side heat exchanger 14 is zero degrees C. or substantially zero degrees C. as illustrated in FIG. 10(b). Consequently, the vehicle air conditioning control device 20 controls the decompression device 13 to decrease the valve opening degree of the decompression device 13 to be smaller than the valve opening degree at the normal operation time. Since the degree of superheat is at zero degrees C. or substantially zero degrees C. in this case, the vehicle air conditioning control device 20 minimizes the valve opening degree of the decompression device 13 as illustrated in FIG. 10(d).

In this way, when an abnormality is generated in the railway vehicle air-conditioning device 50, and the cause of the abnormality is in the load side heat exchanger 14, differences are generated in the state of the degree of superheat in the load side heat exchanger 14 and the instruction value of the valve opening degree to the decompression device 13 by the vehicle air conditioning control device 20, as compared with the case of the railway vehicle air-conditioning device 50 that normally operates.

Accordingly, when an abnormality is generated in the railway vehicle air-conditioning device 50, the special operation is carried out, the fan rotation speed of the load side fan 16 is changed, and when differences are recognized in the state of the degree of superheat and the instruction value of the valve opening degree as compared with the state and the instruction value at the normal operation time, it can be determined that an abnormality is generated in the load side heat exchanger 14.

Here, what is described above is the same for a case where the special operation is carried out in the state at the heating operation time and the fan rotation speed of the heat source side fan 15 is changed. For example, abnormalities in the fan motor 15a of the heat source side fan 15, the heat source side filter 18 and the heat source side heat exchanger 12 can be detected by confirming the degree of superheat of the heat source side heat exchanger 12, the input current value to the fan motor 15a and the instruction value of the valve opening degree at the time of the fan rotation speed of the heat source side fan 15 being changed.

As described above, in the railway vehicle air conditioning management system according to Embodiment 3, the railway vehicle air-conditioning device 50 has the refrigerant circuit 10 configured by the compressor 11, the heat source side heat exchanger 12, the decompression device 13 and the load side heat exchanger 14 being connected with the pipe, and the refrigerant circulating, and includes the vehicle air conditioning control device 20 controlling the operations of the respective devices, and the vehicle air conditioning control device 20 performs a special operation of specifying an abnormal spot, based on the states of the respective devices in the case where the operating state of one element device among the plurality of element devices included in a plurality of devices and controlled by the vehicle air conditioning control device 20 is changed to the second state from the first state.

Thereby, the states of the respective devices differ between a case where the railway vehicle air-conditioning device 50 is normally operating and a case where the railway vehicle air-conditioning device 50 is not operating normally, and hence, it can be determined whether or not an abnormality is generated. Further, when the operating state of a certain element device is changed, the changing state differs in accordance with the abnormal spot, so that the abnormal spot can be specified.

Embodiment 4

In Embodiment 1 to Embodiment 3 described above, it is determined whether it is an abnormal state or not by performing the abnormal state determination processing of the railway vehicle air-conditioning device 50 based on the vehicle air conditioning data of a plurality of railway vehicle air-conditioning devices 50 recorded by the management device 100.

For example, in the related art, the railway vehicle 1 having an abnormality in the railway vehicle air-conditioning device 50 is not basically used. However, the railway vehicle 1 may not be in an abnormal state in which operation of the refrigerant circuit 10 is impossible at all. Further, even when the railway vehicle air-conditioning device 50 is in an abnormal state, the function of transporting passengers in the railway vehicle 1 has no problem. It is desirable that the railway vehicle 1 like this can be used as much as possible.

Figure 11:
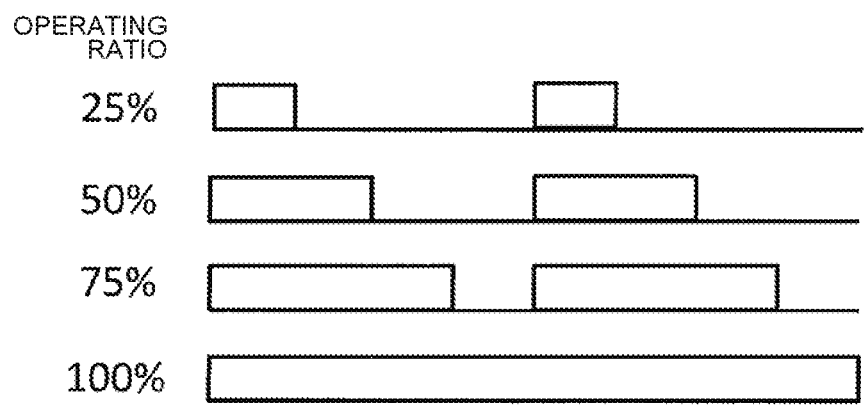
FIG. 11 is a diagram explaining an operating ratio of the railway vehicle air-conditioning device 50 according to Embodiment 4 of the present invention.

FIG. 11 is a diagram explaining an operating ratio of the railway vehicle air-conditioning device 50 according to Embodiment 4 of the present invention. As for an operating ratio in the basic railway vehicle air-conditioning device 50, the operating ratio is determined by deviations between a set temperature and a set humidity, and a temperature and a humidity of suction air. When the operating ratio is high, an operation time period (driving time period of the compressor 11) of the refrigerant circuit 10 is long. When the operating ratio is low, the operation time period of the refrigerant circuit 10 is short.

Figure 12:
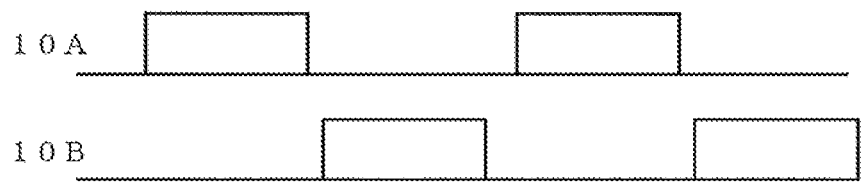
FIG. 12 is a diagram explaining an example of an operating ratio of each of refrigerant circuits 10 in an emergency operation of the railway vehicle air-conditioning device 50 according to Embodiment 4 of the present invention.
Figure 12:
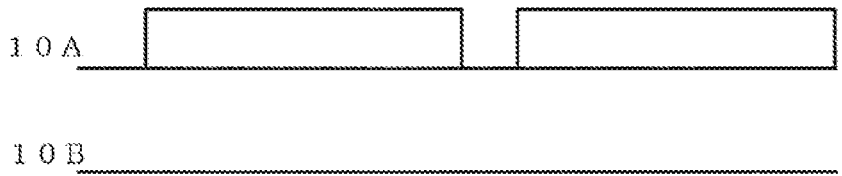

FIG. 12 is a diagram explaining an example of an operating ratio of each of the refrigerant circuits 10 in an emergency operation of the railway vehicle air-conditioning device 50 according to Embodiment 4 of the present invention. FIG. 12(a) shows the operating ratios in a case where both of the refrigerant circuit 10A and the refrigerant circuit 10B normally operate. When the refrigerant circuit 10A and the refrigerant circuit 10B both normally operate, the operation time periods are made equal by making the operating ratios of the respective refrigerant circuit 10 the same, for example.

An example illustrated in FIG. 12(b) shows operating ratios in a case where the refrigerant circuit 10B is in an abnormal state. The emergency operation is an operation that is performed when the railway vehicle air-conditioning device 50 is in an abnormal state, for example. For example, a switch or the like that instructs the emergency operation is installed in the operators seat, and the emergency operation is enabled to be instructed to the vehicle air conditioning control device 20.

As illustrated in FIG. 12(b), in the emergency operation of Embodiment 4, an operation is performed by using the refrigerant circuit 10 that is not in an abnormal state when there is the refrigerant circuit 10 that is not in an abnormal state, and the refrigerant circuit 10 in an abnormal state is not operated. In FIG. 12(b), the refrigerant circuit 10A works instead of the refrigerant circuit 10B.

As described above, in the railway vehicle air-conditioning device 50 of Embodiment 4, when there are the refrigerant circuit 10 that is determined as in an abnormal state and the refrigerant circuit 10 that is determined as not in an abnormal state as a result of performing abnormality determination processing with respect to a plurality of refrigerant circuits 10, the emergency operation using the refrigerant circuit 10 which is determined as not in an abnormal state is performed, so that the railway vehicle 1 can be effectively used.

Embodiment 5

In Embodiment 4 described above, when there is the refrigerant circuit 10 that is not in an abnormal state, among the plurality of refrigerant circuits 10, the refrigerant circuit 10 is operated, and the refrigerant circuit 10 in an abnormal state is not operated.

Here, for example, in the refrigerant circuit 10 that is determined as in an abnormal state, there may be a case where only a sign of abnormality is present, but an abnormality is not generated actually. For example, in the case like this, use of the refrigerant circuit 10 in an abnormal state does not have to be stopped completely. Therefore, the vehicle air conditioning control device 20 may perform an emergency operation with the operating ratios of the respective refrigerant circuits 10 adjusted. For example, the refrigerant circuit 10 in an abnormal state is operated with the operating ratio adjusted to be low and an operation time period limited to be short.

Figure 13:
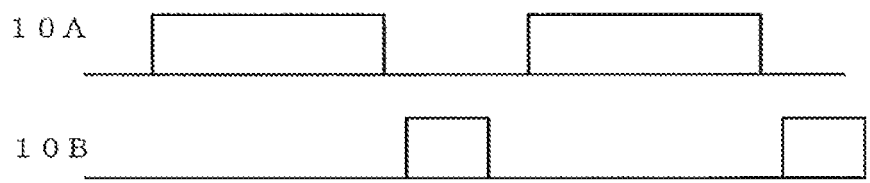
FIG. 13 is a diagram explaining an example of an operating ratio in an emergency operation of the railway vehicle air-conditioning device 50 according to Embodiment 5 of the present invention.

FIG. 13 is a diagram explaining an example of the operating ratios in the emergency operation of the railway vehicle air-conditioning device 50 according to Embodiment 5 of the present invention. An example illustrated in FIG. 13 shows a case where the refrigerant circuit 10B is in an abnormal state. When an emergency operation is performed, a limited operation that causes the operating ratio of the refrigerant circuit 10B in an abnormal state to be lower than the operating ratio in the normal operation is performed. On the other hand, as for the refrigerant circuit 10A, for example, the operating ratio of the refrigerant circuit 10A is adjusted to be higher than the operating ratio in the normal operation. By performing adjustment as described above, an emergency operation adapted to an air conditioning load can be performed by the operating ratio being the same as the operating ratio in the normal operation as the entire railway vehicle air-conditioning device 50, for example.

Embodiment 6

In Embodiment 5 described above, an emergency operation with the operating ratio adjusted to be low is performed for the refrigerant circuit 10 in an abnormal state. Here, at the time of the emergency operation, the refrigerant circuit 10 in an abnormal state may be caused to perform a limited operation with limitation added to an operation ability. For example, an upper limit of the driving frequency of the compressor 11 is set at a driving frequency lower than the upper limit of the normal time. Further, the fan at the evaporator side is set at a maximum rotation speed, and when the decompression device 13 is an electronic expansion valve, liquid back is prevented by decreasing the opening degree.

REFERENCE SIGNS LIST

1 Railway vehicle 10, 10A, 10B Refrigerant circuit 11, 11A, 11B Compressor, 12, 12A, 12B Heat source side heat exchanger 13, 13A, 13B Decompression device 14, 14A, 14B Load side heat exchanger 15, 15A, 15B Heat source side fan 16 Load side fan 15a, 15aA, 15aB, 16a Fan motor 17, 17A, 17B Switching device 18, 18A, 18B Heat source side filter 19, 19A, 19B Load side filter 20 Vehicle air conditioning control device 21, 21A, 22B Pressure sensor 22, 22A, 22B Temperature sensor 30 Vehicle air conditioning storage device 40 Vehicle air conditioning communication device 50 Railway vehicle air-conditioning device 100 Management device 110 Management communication device 120 Management control device 121 Abnormal state determination unit 130 Management arithmetic operation device 140 Management storage device 141 Vehicle air conditioning data recording unit 150 Management display device

The invention claimed is:

1. A railway vehicle air conditioning management system comprising:
    a railway vehicle air-conditioning device installed in a railway vehicle, having a refrigerant circuit configured by including at least a compressor, a heat source side heat exchanger, a decompression device and a load side heat exchanger, and air-conditions an inside of the railway vehicle by circulating refrigerant in the refrigerant circuit; and
    a management device having a management storage device configured to record vehicle air conditioning data including data showing operating states of a plurality of the railway vehicle air-conditioning devices in a plurality of the railway vehicles, wherein the railway vehicle air-conditioning device is configured to perform a special operation of operating in a pre-determined pattern in a state without humans in the railway vehicle, and the management device is configured to record in the management storage device the vehicle air conditioning data including data showing the operating state in the special operation.

2. The railway vehicle air conditioning management system of claim 1, further comprising:

an abnormal state determination device configured to determine whether the railway vehicle air-conditioning device of the railway vehicle to be an object is in an abnormal state with an abnormality or a sign of an abnormality from the vehicle air conditioning data recorded in the management storage device, wherein the abnormal state determination device is configured to search the previously recorded vehicle air conditioning data in the management storage device for the vehicle air conditioning data of the railway vehicle air-conditioning device operated under same conditions at a same time as the railway vehicle air-conditioning device of the railway vehicle to be the object, and determine the vehicle air conditioning data as the vehicle air conditioning data for reference.

3. The railway vehicle air conditioning management system of claim 1, wherein the management storage device is configured to record the vehicle air conditioning data including data showing the operating state relating to an operation of the railway vehicle air-conditioning device in a commercial operation of the railway vehicle, the railway vehicle air conditioning management system further comprises an abnormal state determination device configured to determine whether the railway vehicle air-conditioning device of the railway vehicle to be an object is in an abnormal state with an abnormality or a sign of an abnormality from the vehicle air conditioning data recorded in the management storage device, and the abnormal state determination device configured to search the vehicle air conditioning data in the management storage device for the vehicle air conditioning data of the railway vehicle of a same vehicle number with another train car composition that operates in a same route as the railway vehicle to be the object, and determine the vehicle air conditioning data as the vehicle air conditioning data for reference.

4. The railway vehicle air conditioning management system of claim 2, wherein the abnormal state determination device is configured to further search the vehicle air conditioning data in the management storage device for the vehicle air conditioning data of the railway vehicle of a same year of manufacture within a predetermined range among the searched vehicle air conditioning data, and determine the vehicle air conditioning data of the railway vehicle of the same year of manufacture within the predetermined range as the vehicle air conditioning data for reference.

5. The railway vehicle air conditioning management system of claim 2, wherein the abnormal state determination device is configured to further search the vehicle air conditioning data in the management storage device, among the searched vehicle air conditioning data, for the vehicle air conditioning data of the railway vehicle of a same operation time period within a predetermined range after repair of the railway vehicle air-conditioning device, and determine the vehicle air conditioning data of the railway vehicle of the same operation time period within the predetermined range as the vehicle air conditioning data for reference.

6. The railway vehicle air conditioning management system of claim 2, wherein the abnormal state determination device is configured to determine whether the railway vehicle air-conditioning device of the railway vehicle to be the object is in the abnormal state, based on data on at least one of a temperature and a pressure in the refrigerant circuit in a predetermined time after actuation of the compressor among the vehicle air conditioning data.

7. The railway vehicle air conditioning management system of claim 6, wherein the abnormal state determination device is configured to determine whether liquid back is generated in the railway vehicle air-conditioning device of the railway vehicle to be the object, based on data on a discharge temperature of refrigerant discharged by the compressor.

8. A railway vehicle air-conditioning device installed in a railway vehicle, having a refrigerant circuit configured by including at least a compressor, a heat source side heat exchanger, a decompression device and a load side heat exchanger, and air-conditioning an inside of the railway vehicle by circulating refrigerant, the railway vehicle air-conditioning device comprising:

a plurality of the refrigerant circuits; and a vehicle air conditioning control device configured to cause a refrigerant circuit, of the plurality of refrigerant circuits, in an abnormal state with an abnormality or a sign of an abnormality to stop an operation or to perform an emergency operation in which an operation time is limited to an operation time different from the operation time of other refrigerant circuits of the plurality of refrigerant circuits.

9. The railway vehicle air-conditioning device of claim 8, wherein the vehicle air conditioning control device limits is configured to limit an operation ability of the refrigerant circuit in the abnormal state.

* * * * *